United States Patent
Payne et al.

[15] 3,678,631
[45] July 25, 1972

[54] CO-ORDINATED PERIODIC LUBRICATION SYSTEM FOR MACHINE TOOLS

[72] Inventors: Winslow C. Payne, Worcester; Gerard M. Trottier, Millbury, both of Mass.

[73] Assignee: The Warner & Swasey Company, Cleveland, Ohio

[22] Filed: June 29, 1970

[21] Appl. No.: 50,713

[52] U.S. Cl. ........................................ 51/165.77, 184/6.4
[51] Int. Cl. ........................................ B24b 49/00
[58] Field of Search ............ 51/165 R, 165.77, 165.9, 165.91, 51/165.92; 184/6.14, 6.4

[56] References Cited

UNITED STATES PATENTS

| | | | |
|---|---|---|---|
| 1,942,180 | 1/1934 | Martin | 184/6.14 |
| 2,723,503 | 11/1955 | Mader | 51/105 |
| 2,792,911 | 5/1957 | Harter | 184/7 |
| 2,934,861 | 5/1960 | Engel | 184/6.4 X |
| 3,127,954 | 4/1964 | Callahan et al. | 184/7 |
| 3,171,234 | 3/1965 | Hill | 51/105 |
| 3,527,322 | 9/1970 | Roberts | 184/6.4 |

Primary Examiner—Lester M. Swingle
Attorney—Thomas L. Tarolli and Calvin G. Covell

[57] ABSTRACT

The combination of a cyclically operative periodically actuated bearing assembly and/or bearing surface lubricating system with a machine tool lubricated thereby including component parts thereof relatively movable about or along bearing assemblies and/or coacting bearing surfaces according to a predetermined machining cycle by feeding means responsive to signals from automatic cyclically operative control means therefore, including means operative to actuate the periodic lubricating system responsive to selected signals from the control means to the feeding means so that periodic operation of the lubricating system is co-ordinated with the relative movement of component parts of the machine tool, and monitoring means activated periodically with the lubricating system and operative to interrupt the machining cycle whenever the lubricating system fails to complete its operating cycle.

10 Claims, 1 Drawing Figure

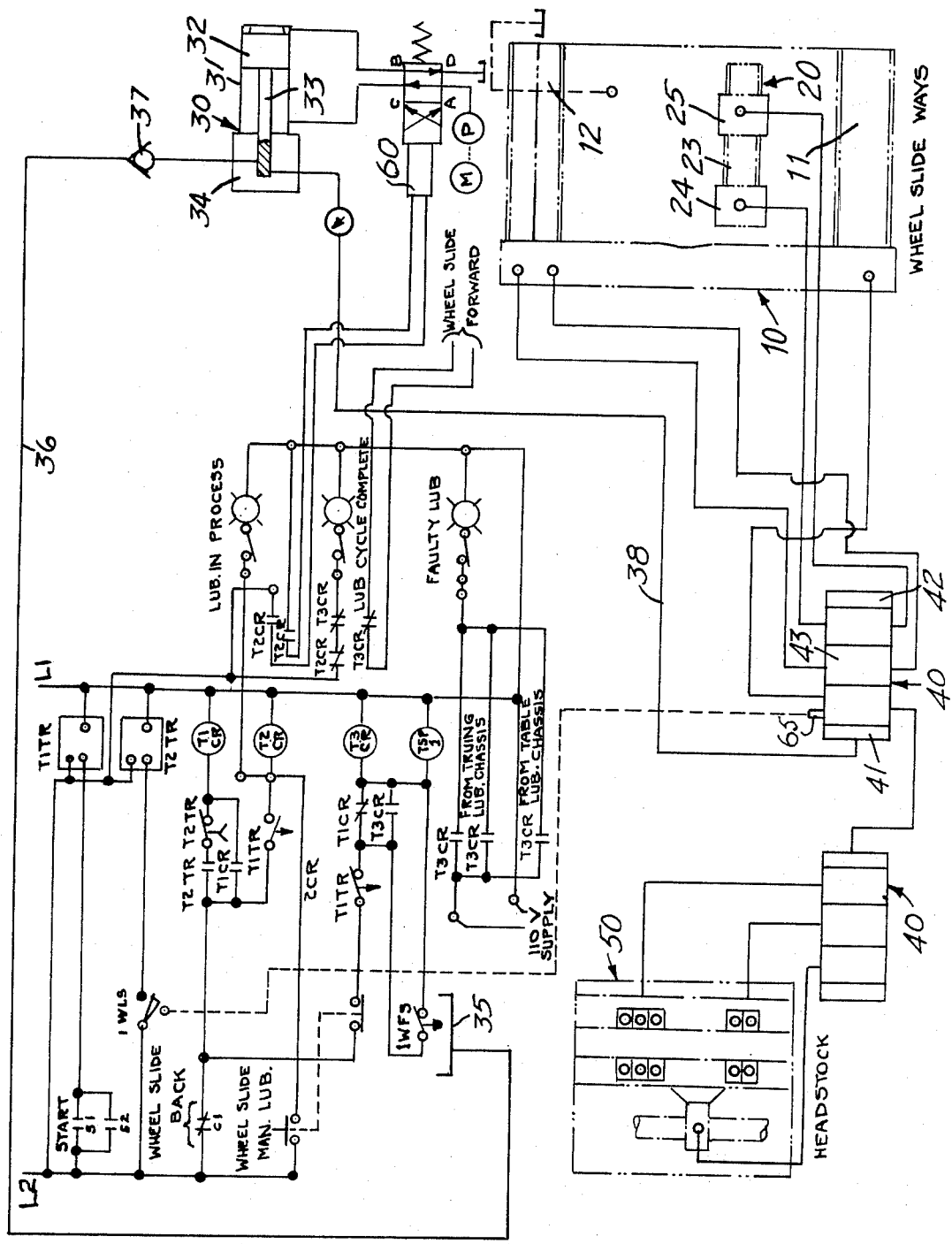

CO-ORDINATED PERIODIC LUBRICATION SYSTEM FOR MACHINE TOOLS

BACKGROUND OF THE INVENTION

It has been common practice to provide lubricating systems as required in various different types of machine tools of which the grinding machines described and illustrated in U.S. Pat. Nos. 2,723,503 and 3,171,234 are representative. The lubricating system used for such applications frequently comprises an arrangement for continuously circulating a pressurized fluid lubricant to and from the various different bearing assemblies and/or coacting bearing surfaces throughout the machine tool. Alternatively, the lubricating system may consist of a cyclically operative periodically actuated lubricating system to deliver metered quantities of a fluid lubricant sequentially to the various different bearing assemblies and/or coacting bearing surfaces at intervals determined either by an associated timer device which functions independently of the operating cycle of the machine tool so lubricated or by mechanical or other operative connection to a cyclically operable component of the machine tool lubricated thereby, or by other suitable actuating means at the desired intervals.

On some machine tools a first continuous lubricating system arranged to circulate a pressurized lubricating fluid may be supplemented by a second periodic lubricating system commonly controlled by a timer operative at intervals independent of the operating cycle of the machine tool.

U.S. Pat. Nos. 2,792,911 and 3,229,786 and 3,371,745 illustrate and describe details of cyclically operative lubricating apparatus for delivering metered quantities of a fluid lubricant sequencially to a series of different sites at which lubrication is required. U.S. Pat. No. 2,996,147 illustrates one suitable arrangement for providing an external indication such a lubricating system has been cycled, specifically a plunger connected to and movable with a metering piston assembly and extending through the surface of the housing within which the metering piston is cycled. U.S. Pat. No. 3,127,954 illustrates and describes details of one type of monitoring system suitable for use with the type of cyclically operative lubricating system referred to in U.S. Pat. Nos. 2,792,911 and 3,229,786 and 3,371,745.

SUMMARY OF THE INVENTION

In machine tools, and particularly in complex precision grinding machines of the type referred to in U. S. Pat. Nos. 2,723,503 and 3,171,234 respectively operative according to an automatically controlled predetermined grinding cycle, it is essential to provide sufficient lubrication of all relatively moving components during each operating cycle, and it may be necessary to avoid adding the lubricating fluid during some critical portion of the operating cycle. For example, in a precision grinding machine arranged to finish portions of a given workpiece to precise dimensions and to a surface finish both within extremely narrow tolerances it is important not to operate a periodically actuated lubricating system during the final portion of the grinding cycle, in order to avoid "Floating" the grinding wheel slide, or an equivalent machine component, with consequent loss of accuracy in the finished workpiece.

With this objective, this invention contemplates the combination of a periodically actuated cyclically operative lubricating apparatus of the type referred to in U.S. Pat. No. 2,792,911 with a machine tool such as a precision grinding machine, wherein the lubricating system, including a selected series of metering units all operative sequentially within a relatively short time interval, is actuated by a given signal from the automatic control system effective to initiate a particular movement included in the grinding wheel feeding cycle, selected to perform this added function simultaneously so that the operating cycle of the lubricating apparatus is completed before the final feeding movement of the grinding wheel to finish the workpiece is initiated, and wherein a monitoring means operatively connected to the control system for the grinding wheel feeding cycle, and activated each time the lubricating apparatus is activated, functions to interrupt the grinding wheel feeding cycle whenever the lubricating system fails to complete its operating cycle.

Thus the instant invention assures the operation of an associated periodically actuated lubricating apparatus within the proper portion of each cyclic machining operation performed by a given machine tool, and also interrupts a given cyclic machining operation and precludes subsequent cyclic machining operations of a grinding machine or other machine tool, whenever the associated periodically operative lubricating apparatus fails to complete its entire lubricating cycle.

BRIEF DESCRIPTION OF THE DRAWING

The drawing includes a schematic representation of a commercially available periodically actuated cyclically operable lubricating apparatus shown operatively connected to representative machine tool components lubricated thereby, for example, a typical arrangement of ways suitable for supporting a grinding wheel slide and a representative showing of a typical feed screw and nut assembly corresponding to the arrangements for feeding the grinding wheel slide relative to the grinding machine base illustrated and described in each of U.S. Pat. Nos. 2,723,503 and 3,171,234. This showing also includes, by way of example, a representation of a headstock assembly lubricated at the same time by the same lubricating apparatus.

The drawing also includes a simplified schematic representation of electrical circuits effective to operatively interconnect the electrical control for the lubricating system and the device which functions as the monitoring means with the automatic control system for a grinding machine wheel feeding cycle, and schematic circuits for suitable status and warning lights for the lubricating system.

DESCRIPTION OF THE PREFERRED EMBODIMENT

In the drawing, a reference numeral 10 generally designates a schematic representation of a typical arrangement of machine tool slide ways designated, for purposes of illustration, as the wheel slide ways of a grinding machine including flat way 11 and V-way 12, and the reference numeral 20 generally designates a typical cutting tool feed mechanism, for example the grinding wheel feed screw 23 supported for sliding longitudinal movement in feed screw guide 24 and threadably engaged with a full or half wheel feed nut.

Reference numeral 30 generally designates the lubricating apparatus piston pump including a cylinder 31, 31 43 each a piston 32 attached to a piston rod 33 extending into a chamber 34 of the size necessary to produce the required volume of lubricating fluid to cycle the lubricating apparatus when the piston 32 is displaced to the left hand end of the cylinder 32 from the position illustrated in the drawing. The chamber 34 is connected to a fluid lubricant supply 35 through a conduit 36 including suitable means represented by check valve 37 for preventing reverse flow from the chamber 34 to the supply 35. The chamber 34 is connected through conduit 38, likewise limited to unidirectional flow to the end block 41 of a metering unit assembly generally designated by reference numeral 40 also including a second end block 42 and the requisite number of metering units 43 each enclosing a reciprocating metering piston and suitable ports interconnected with each other and with ports in adjacent metering units 43 so that the pistons contained in the respective metering units are reciprocated according to a predetermined sequence repeated cyclically each time the requisite quantity of fluid lubricant for one complete lubricating cycle is delivered from the chamber 34. For details of a typical metering unit assembly see U.S. Pat. No. 2,792,911.

In a machine tool in which lubrication is required at another location at the same time and at the same frequency, the lubricating apparatus can be expanded as illustrated in the drawing to include a second metering unit assembly 40 connected in series to the first metering unit assembly referred to above so that operation of these two assemblies by the requisite quantity of lubricating fluid from the chamber 34 will provide sequential distribution of the lubricating fluid both to various points on the wheel slide ways and also to additional points shown on the drawing as comprising bearing assemblies incorporated in a headstock generally designated by the reference numeral 50.

Considering next the operation of a typical machine tool incorporating the instant invention, the drawing includes simplified schematic representations of the essential features of the electrical and hydraulic circuits necessary to interconnect a precision grinding machine and a periodic lubricating system according to the teachings of the instant invention. Since the electrical and hydraulic systems comprising a feed means and an automatic cyclically operative control means therefore in a typical precision grinding machine are well known as indicated by U.S. Pat. Nos. 2,723,503 and 3,171,234 and other prior patents, and since the operation of the instant invention does not depend on details of either the feeding means or the automatic cyclically operative control means therefore, details of these systems are omitted for the sake of clarity.

The grinding machine incorporating the instant invention is energized initially by closing the normally open contacts S1, S2 to energize the circuits of its automatic feed control system and to energize the circuit including time delay relay T1TR energized immediately and having contacts delayed a predetermined time interval after it is de-energized.

By operation of the automatic control systems the wheel slide is moved forward toward the work until the automatic control system therefore reverses the movement of the wheel slide by signaling the wheel feeding means to retract, at which time delay relay T1TR is de-energized. At the same time, the normally closed contact C1, coupled to work with contacts S1, S2 and held open while the wheel slide goes forward, is closed to energize control relay T2CR through the timed to open contact of time delay relay T1TR which has remained closed after time delay relay T1TR is de-energized.

Energization of control relay T2CR closes the normally open contacts thereof to energize the solenoid 60 of the control valve for piston pump 30 operative thereby to admit pressurized hydraulic fluid, supplied by pump P driven by motor M, to the right hand end of cylinder 31 to displace piston 32 and thereby transmit a predetermined quantity of lubricating fluid through conduit 38 to the first metering unit assembly 40, and thence to any additional metering unit assemblies supplied therethrough.

During a single lubricating cycle of the metering unit assembly 40 the plunger 65 will be cycled once with the metering piston to which it is connected, thereby closing and then opening limit switch 1WLS.

Therefore, in order to be certain limit switch 1WLS is both closed and then opened each time the lubricating apparatus actuated to insure proper operation of the monitoring circuits, the metering pump 30 is selected and/or adjusted so that the volume of lubricating fluid delivered by each working stroke of piston 32 exceeds the volume of lubricating fluid required to produce one complete lubricating cycle.

When limit switch 1WLS is closed it energizes time delay relay T2TR delayed to remain energized a predetermined time interval after it is energized which in turn energizes control relay T1CR, which when energized opens the circuit to control relay T3CR which when energized operates to open a normally closed contact to interrupt the portion of the control system normally operative to actuate the wheel slide for forward movement.

Thus, timely operation of limit switch 1WLS by completion of a lubricating cycle renders inoperative the faulty lubrication circuit controlled by control relay T3CR, thereby permitting the grinding wheel feed cycle to continue and recycle normally.

Since it is characteristic of the metering unit assembly 40 that it will not continue to function whenever the passage of fluid lubricant to any one of the locations to which it is connected, and since failure of the metering unit assembly to complete the cycle will result in failure to cycle plunger 65 to close and then open limit switch 1WLS to complete and then interrupt the circuit to time delay relay T2TR, time delay relay T2TR will remain de-energized with the consequence control relay T1CR will not be energized to open its normally closed contacts through which the faulty lubrication control relay T3CR will be energized later, if the timed to close contacts of time delay relay T1TR close a predetermined time interval after de-energization of time delay relay T1TR and with the normally closed contacts of control relay T1CR remaining closed.

From the showing in the drawing, it will be evident the electrical system described above may also include suitable circuits to energize status lights to indicate a lubrication cycle is in process, and then to indicate a lubrication cycle is completed, as well as warning light illuminated when the faulty lubrication circuit is operated by control relay T3CR to interrupt the circuit within the automatic feed control system through which the wheel slide feed is actuated to send the wheel slide forward.

The electrical circuits illustrated in the drawing and described above in relation to the wheel slide feed may be duplicated as many times as necessary within a given grinding machine or other machine tool in order to provide lubricating cycles for other component parts of the machine tool which may require lubrication at intervals different than that required for the wheel feed.

Any such additional circuits can conveniently be interconnected with the circuit illustrated in the drawing to the extent they would share the same warning light circuit to indicate faulty lubrication as indicated by the contacts of control relay T3CR designated as from the truing lubrication chassis and from the table lubrication chassis, for example, which may be included in a typical precision grinding machine when the grinding machine includes a truing tool cycled less frequently than the wheel feed and a work supporting table moveable either during or between succeeding grinding cycles.

In applications wherein the quantity of the lubricant required at any given location is smaller than the amount which can be reliably distributed in the proper amount during each succeeding feeding or moving cycle, the circuit through which the lubricating apparatus is actuated may be modified to include therein a suitable switch controlled by a counter mechanism selectively adjustable to maintain the switch open and the lubricating apparatus control means inoperative for the number of feeding or moving cycles between succeeding lubricating cycles determined by the setting of the counter.

We claim:

1. A machine tool including
   first supporting means for a cutting tool,
   a cutting tool supported thereby,
   second supporting means for a given workpiece to be machined,
   bearing means arranged to accommodate relative movement between said first and said second supporting means,
   feeding means interconnecting said first supporting means and said second supporting means,
   feed control means for said feeding means operative automatically to actuate said feeding means to produce sequentially relative retracting and feeding movement between said cutting tool and a given workpiece on said second supporting means according to a predetermined feeding cycle in which a predetermined final feeding portion thereof constitutes a finish feed,
   A lubricating apparatus cyclically operable to distribute metered quantities of a fluid lubricant sequentially to a plurality of different locations within said machine tool including said bearing means and said feeding means,
   lubricant control means operative to actuate said lubricating apparatus in response to a signal from said feed control means transmitted during a portion of the predetermined feeding cycle other than said final feeding portion thereof, and lubricating apparatus monitoring means including sensing means actuated and reset during a single lubricating cycle, said monitoring means being activated when said lubricating apparatus is actuated and operative whenever said lubricating apparatus fails to complete a lubricating cycle to render inoperative said feed control means and thereby interrupt said predetermined feeding cycle.

2. A machine tool as described in claim 1, and, in addition, counting means arranged to count the number of cycles completed by said feeding means and operative to maintain said lubrication control means inoperative for a predetermined number of cycles of said feeding means.

3. A machine tool as described in claim 1 wherein said machine tool comprises a grinding machine, said cutting tool comprises a grinding wheel rotatably mounted on said first supporting means, and the given workpiece is mounted rotatably upon said second supporting means.

4. A machine tool as described in claim 3 wherein said lubricating apparatus includes at least one metering unit assembly each including a plurality of reciprocating metering units respectively connected with a plurality of locations to be lubricated and mutually interconnected to be reciprocated sequentially responsive to the delivery of pressurized lubricating fluid to each said metering unit assembly, and a metering pump operated by said lubrication control means to deliver a quantity of lubricating fluid sufficient to cycle every said metering unit assembly.

5. A machine tool as described in claim 4 wherein 28 said metering pump operated by said lubrication control means is arranged to deliver a predetermined quantity of lubricating fluid in excess of the amount sufficient to cycle every said metering unit assembly through one complete lubricating cycle.

6. A machine tool as described in claim 3 wherein said lubricating apparatus monitoring means comprises a feeding cycle stop means operative to render said feed control means inoperative, a timer means actuated when said lubricating apparatus is actuated and operative after a predetermined time interval in excess of the time required to complete a single lubricating cycle to energize said feeding cycle stop means, and means operative during each complete lubricating cycle to render said feeding cycle stop means inoperative when a lubricating cycle is completed before said timer means operates.

7. A machine tool as described in claim 3 including at least one additional feeding means, at least one additional feed control means each operative to actuate one said additional feeding means, at least one additional lubricating apparatus cyclically operative to distribute predetermined metered quantities of a fluid lubricant to each said additional feeding means, and at least one additional lubrication control means each actuated by one said additional feed control means and operative in response to a signal from said additional feed control means connected thereto to actuate one said additional lubricating apparatus.

8. A machine tool as described in claim 7 wherein one said additional lubricating apparatus is operative to lubricate bearing means and feeding means for a truing tool mechanism.

9. A machine tool as described in claim 7 wherein one said additional lubricating apparatus is operative to lubricate bearing means and table feeding means for a movable table.

10. A machine tool as described in claim 9, and, in addition, counting means arranged to count the number of cycles completed by said table feeding means and operative after one said additional lubricating apparatus is actuated during a given feeding cycle to maintain inoperative during a predetermined number of succeeding feeding cycles said additional lubrication control means operative to actuate said additional lubricating apparatus operative to lubricate said bearing means and said feeding means for said movable table.

* * * * *